United States Patent [19]

Frumkin

[11] Patent Number: 5,249,878

[45] Date of Patent: Oct. 5, 1993

[54] SHEAR PUCK

[76] Inventor: Mitchell H. Frumkin, 7 Nancy St., Kendall Park, N.J. 08824

[21] Appl. No.: 991,110

[22] Filed: Dec. 16, 1992

[51] Int. Cl.⁵ ............................................. F16B 43/00
[52] U.S. Cl. ..................................... 403/291; 411/531; 428/65; 403/188
[58] Field of Search ................. 403/407.1, 408.1, 291, 403/188, 243, 247, 256, 260, 280; 411/531, 908, 446; 248/649, 635, 633, 678; 428/65, 66, 442, 241

[56] References Cited

U.S. PATENT DOCUMENTS

| | | | |
|---|---|---|---|
| 2,117,567 | 5/1938 | Myer et al. | 403/280 |
| 2,284,214 | 5/1942 | Kelly | 403/408.1 |
| 3,495,907 | 2/1970 | Rogers | 411/531 X |
| 3,841,032 | 10/1974 | Grannis, III | 248/678 X |
| 4,013,373 | 3/1977 | Lamprecht et al. | 403/291 |
| 4,984,938 | 1/1991 | Scott, Jr. et al. | 405/259.1 |

FOREIGN PATENT DOCUMENTS 0547551 9/1942 United Kingdom ................ 411/531

OTHER PUBLICATIONS

Roads and Streets, Dec. 1940, p. 58.

Primary Examiner—Randolph A. Reese
Assistant Examiner—Christopher J. Novosad
Attorney, Agent, or Firm—Max Goldman

[57] ABSTRACT

A fiber-glass shear puck for connecting, and transferring load between abutting together is disclosed. The shear puck is in the shape of a cylindrical section with planar side walls and is easier to manufacture and has greater strength and load bearing capacity than existing fiber-glass shear pucks.

9 Claims, 2 Drawing Sheets

SHEAR PUCK

BACKGROUND OF THE INVENTION

Shear pucks are employed in construction for connecting abutting columns or beams to each other. The pucks are made of either metal or composite materials such as fiber-glass, and are usually in the form of cylindrical sections.

Composite material shear pucks are used extensively, for example, in the construction of cooling towers, which are employed by power plants or other industrial facilities to cool and recycle cooling water that is heated by the industrial process. Cooling towers are usually square or rectangular in shape and can typically range in size from 150' to 50' on a side to from 20' to 50' in height. The water to be cooled is pumped up to the top of the tower then allowed to flow downward to the bottom of the tower. Exhaust fans at the top of the tower are operated to suck the vapor created by the cooling of the water up and out through the open top of the tower.

The inside of the cooling tower is comprised of a matrix of wooden vertical columns connected to horizontally disposed beams. The vertical columns can be typically four inch by four inch wooden beams with a length about the height of the tower. The horizontal beams can be, typically, two inches by six inches in dimension. The vertical columns are usually set about six feet apart and the horizontal beams are arranged in levels about every six feet. Thus, in a tower which is thirty six feet high, there are six levels. The average cooling tower therefore requires many thousands of connections between the vertical columns and the horizontal beams.

Depending on the load carried on the beam, the connection between a beam and a column may be a bolt only, or a combination of shear pucks and a bolt. The purpose of the shear puck is to spread the load carried by the beam to a larger area than carried with a bolt only, i.e. the circumferential surface area of the shear puck rather than the much smaller circumferential surface area of the bolt. When the cooling tower is designed, the design engineer determines the load distribution on the beams and then determines the number and placement of bolt only connections and shear puck with bolt connections. Also, depending on the specific loads borne at each location, the size of the shear pucks to be use is determined.

Present shear pucks of composite material, such as fiber-glass, are made by a high temperature compression molding manufacturing process. The process requires the use of metallic mold increasing the costs of the pucks. In addition, due to curing problems, the inner area of the pucks must be hollowed out, thereby weakening the strength of the puck and decreasing its load bearing capability. There is, therefore a need for a shear puck which is easier, faster and more economical to manufacture and which has greater strength and load carrying capacity than presently available shear pucks.

OBJECTS OF THE INVENTION

Accordingly, it is a general object of this invention to provide a shear puck which overcomes the shortcomings of present shear pucks.

It is a further object of this invention to provide a shear puck which is easier, faster and less expensive to manufacture than present shear pucks.

It is still a further object of this invention to provide a shear puck which has greater load bearing capacity than present shear pucks.

It is still yet a further object of this invention to provide a shear puck which can bear the same load as a present shear puck with a smaller diameter bolt than that required with the present shear puck.

SUMMARY OF THE INVENTION

These and other objects of the invention are achieved by providing a shear puck which is in the shape of a section of a cyclinder with planer sides. The shear puck is made of fiberglass material which comprises a continuous strand glass mat which is approximately 35 to 40% by weight of the puck and an isophtalic polyester resin which is approximately 60 to 65% by weight of the puck. It is produced by a resin transfer molding process which does not require heat and which can use nonmetallic molds, such as urethane.

DESCRIPTION OF THE DRAWING

Other objects and many of the intended advantages of this invention will be readily appreciated when the same becomes better understood by reference to the following detailed description when considered in connection with the accompanying drawings wherein.

DETAILED DESCRIPTION OF THE PREFERRED EMBODIMENTS

Figure 1:
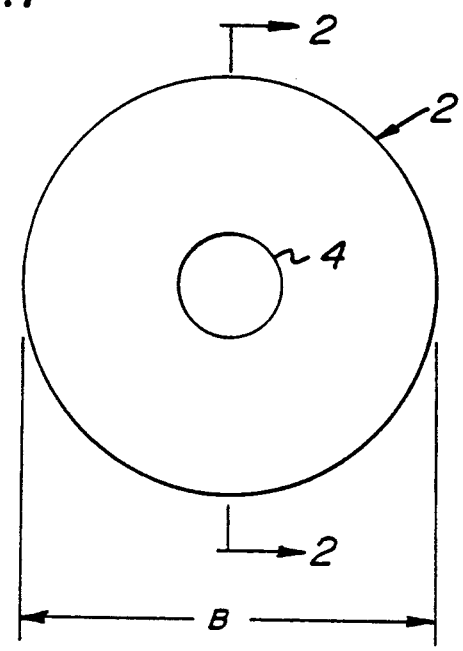
FIG. 1 is a top plan view of the shear puck of the present invention.
Figure 2:
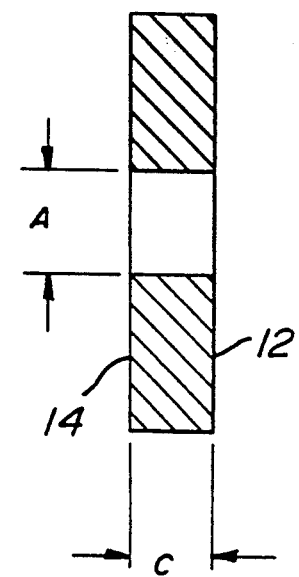
FIG. 2 is a sectional view of the shear puck of the present invention taken along the line 2—2 of FIG. 1.

Referring now in greater detail to the various figures of the drawing, wherein like reference characters refer to like parts, there is shown in FIGS. 1 and 2 a shear puck 2 of the instant invention. It can be seen that the shear puck 2 is a regularly shaped section of a cylinder with planar sides 12 and 14. The shear puck 2 has a hole 4 through which a bolt 18 (see FIG. 4) is placed when the shear pucks 2 are mounted to the beams and columns as will be explained later.

Exemplary dimensions and tolerances for the shear pucks 2 for A (diameter of the bolt hole 4), B (diameter of the shear puck 2) and C (width of the shear puck 2) are given in the Table I below.

TABLE I

| Puck No. | Dimensions and Tolerances | | |
|---|---|---|---|
| | A | B | C |
| 1 | 9/16"(+1/32 − 0) | 2¼"(+0 − 1/32) | ¾"(+1/32 − 0) |
| 2 | 9/16"(+1/32 − 0) | 2¼"(+0 − 1/32) | 1"(=1/32 − 0) |
| 3 | 7/16"(+1/32 − 0) | 2¼"(+0 − 1/32) | 1"(+1/32 − 0) |

Thus it can be seen from the table that Pucks Nos. 2 and 3 are one inch, double width shear pucks, and only one shear puck is required per connection as will be explained later with the aid of FIGS. 3 and 4. On the other hand, Puck No. 1 is a one half inch, single width shear puck, two of which are required, abutting each other, per connection.

The holes 4 dimensions are approximately 1/16" larger in diameter than the bolts which are placed therethrough. Thus for shear pucks with 9/16" holes (Pucks Nos. 1 and 2 above) bolts with ½" diameter shafts would be used, whereas for shear pucks with 7/16" holes, bolts with ⅜ diameter shafts would be used.

The shear pucks 2 of the present invention are made of fiber-glass composed of approximately 35 to 40% Continuous Strand Glass Mat and 60 to 65% Isophtalic Polyester Resin. They are manufactured by a resin transfer molding process, which does not require high temperature.

Figure 3:
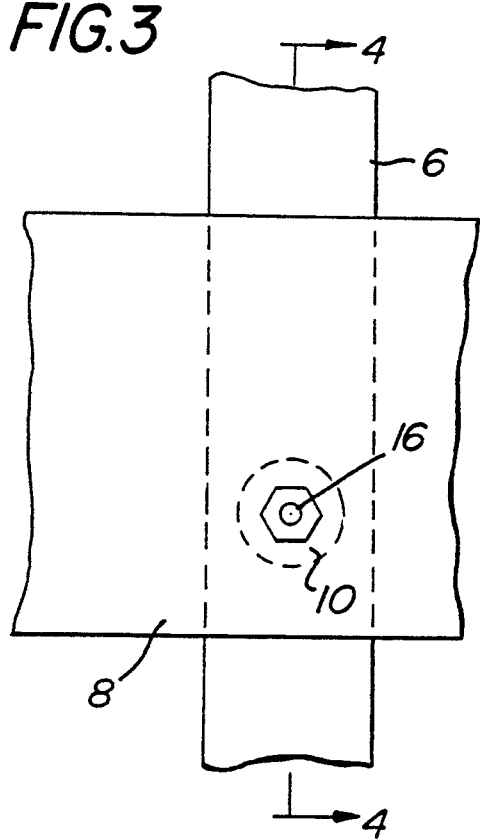
FIG. 3 is a vertical side view of a pair of horizontal beams connected to a vertical column by shear pucks of the present invention.
Figure 4:
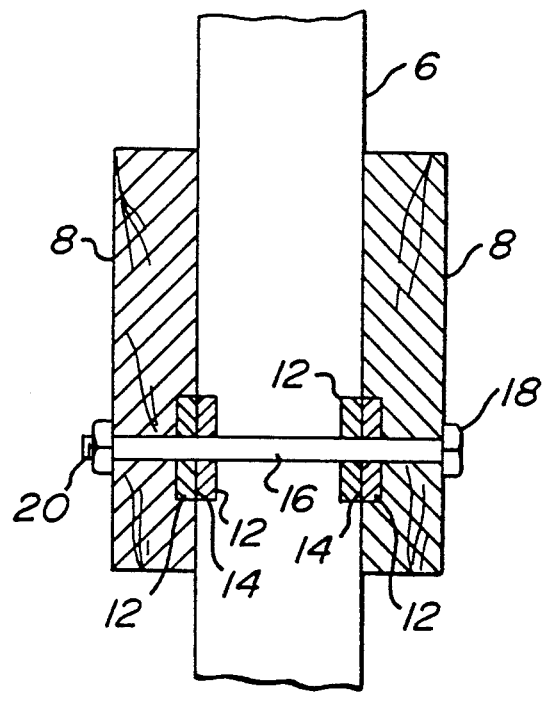
FIG. 4 is a sectional view of the connection of the beams to column taken along the line 4—4 of FIG. 3.

Referring now to FIGS. 3 and 4, the placement of the shear pucks 2 to connect vertical column 6 to horizontal beams 8 and to transfer load from the horizontal beams 8 to the vertical column 6 will now be explained. As previously stated, the vertical column 6 is commonly a 4" by 4" wooden column of the height of the cooling tower and the horizontal beams are commonly 2" by 6" wooden beams when used to erect cooling towers, although the shear pucks 2 of the present invention can be used to connect beams for any other purposes or structures.

The vertical column 6 and the horizontal beams 8 are counter sunk or "dapped" to form an area 10 to a depth equal to the width of the shear pucks 2. Thus when the shear pucks 2 are placed in the counter sunk area 10, one side 12 of the shear pucks 2 abuts the bottom of the countersunk area 10 while the other side 14 of the shear pucks 2 is flush, with the surface of the vertical column 6 or the horizontal beams 8, when ½" shear pucks 2 are used. A hole 16 drilled in the center of the shear pucks 2, allows for the passage of a bolt 18. Holes are also drilled through the vertical column 6 and the horizontal beams 8, in line with the holes 4 of the shear pucks 2, for insertion of the bolt 18. The bolt 18 secures the assembly i.e., the vertical column 6, the horizontal beams 8 and the shear pucks 2, in place. A retaining nut 20 is threaded onto the end of the bolt 18 to the tighten the assembly.

Single or double width shear pucks 2 can be used. If single width (½") shear pucks 2 are used, two are used at each connection of a horizontal beam 8 to a vertical column 6, as shown in FIG. 4. Therefore, a shear puck 2 is first placed in the counter sunk or dapped area 10 of the vertical column 6. A second shear puck 2 is then placed in the counter sunk area 10 of the horizontal beam 8, with the sides 14 of the shear pucks 2 abutting each other. If double width (1") shear pucks 2 are used, the horizontal beam 8 is positioned alongside the vertical column 6, to allow for the placement of a single shear puck 6 in the counter sunk areas of the vertical column 6 and the horizontal beam 8, with one side 12 of the shear puck 2 abutting the bottom of the countersunk 10 of the vertical column 6 and the other side 14 of the shear puck 2 abutting the bottom of the countersunk hole 10 in the horizontal beam 8. Thus, when the horizontal beam 8 is abutted against the vertical column 6, the single shear puck 2 holds the horizontal beam 8 in place and transfers the load on the horizontal beam 8 to the vertical column 6. On the other hand, with two single width shear pucks 2, the load on the horizontal beam is transferred to the vertical column 6 via the bolt 18. This places shear stress on the surface of the shear pucks 2 at the hole 4 which is in contact with the bolt 18.

Figure 5A:
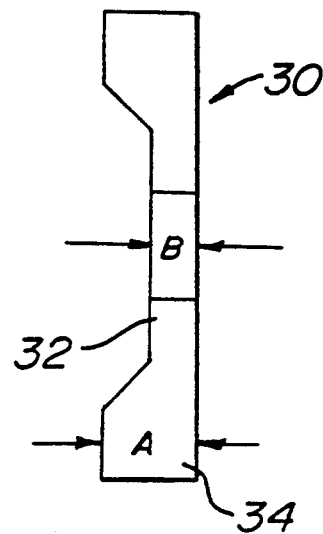
FIG. 5A is a vertical side view of the prior art shear puck.
Figure 5B:
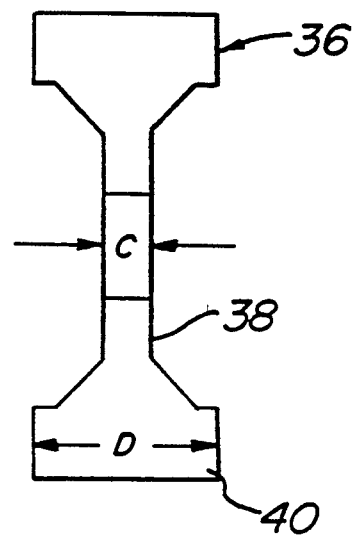
FIG. 5B is a vertical side view of a double width prior art shear puck.
Figure 5C:
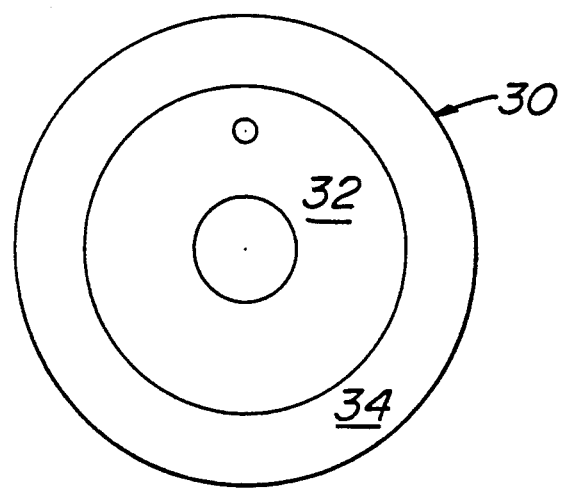
FIG. 5C is a plan top view of the prior art shear puck.

FIGS. 5A, 5B and 5C show various views of prior art shear pucks 30. FIG. 5A is a side view of a single width A, ½" shear puck 30. The outer portion 34 is ½" wide. However, the width B of the central portion 32 of the shear puck is reduced, in this case from ½" to 5/16". Similarly, the width C of the central portion 38 of the double shear puck 36 of FIG. 5B has been reduced from the 1" width D of the outer portion 38 to ⅝". These reductions in width are made necessary by the curing problems which occurs with the present high temperature, compression molding process used to manufacture the shear pucks. FIG. 5C shows a top plan view of the ½" wide prior art shear puck.

This hollowing out of the central portions of the shear pucks 30 and 36 reduces the ultimate loads that the prior art pucks can carry as compared to the shear pucks 2 of the present invention. For example, testing has shown that the one half inch wide shear pucks 2 of the present invention have an ultimate load capacity of 4404 pounds, as compared to an ultimate load capacity of 3,066 pounds for the prior art one half inch wide shear pucks. Similarly, the one inch shear pucks 2 of the present invention have an ultimate load capacity of 14,590 pounds as compared to an ultimate load capacity of 5,280 pounds for prior art one inch shear pucks. Thus, the shear pucks of the present invention offer substantial advantages over existing shear pucks. For a given installation, either heavier loads may be carried with the same number and size of shear pucks of the present invention than with existing shear pucks, or the size or number of shear pucks may be reduced to carry a given load. In addition, bolts of smaller dimension may also be used to carry a given load than with the existing shear pucks. These choices are made by the designers of the structure. However it is clear that substantial saving in money, labor and material are available through use of the shear pucks of the present invention as compared to use of existing shear pucks.

Without further elaboration, the foregoing will so fully illustrate my invention that others may, by applying current or future knowledge, readily adopt the same for use under the various conditions of service.

I claim:

1. A shear puck for connecting abutting beams comprising:
   (a) a composite material;
   (b) a cylindrical section having planer sides;
   (c) a hole through the center of said puck and wherein said composite material is fiber-glass.

2. The shear puck of claim 1 wherein said fiber-glass comprises approximately 35-40% continuous strand glass mat and approximately 60-65% of isophalic polyester resin.

3. The shear puck of claim 2 wherein said shear puck is formed by a resin transfer molding process.

4. The shear puck of claim 2 wherein said shear puck is approximately one half inch in width and approximately two and one half inches in diameter.

5. The shear puck of claim 4 wherein said shear puck is approximately one inch in width and is approximately two and one half inches in diameter.

6. A connection between two abutting first and second beams, each of said beams comprising a countersunk area and a first hole through the centers of said countersunk areas extending through the beams, said connection comprising:
(a) at least one shear puck placed in said countersunk holes, said at least one shear puck comprising :
  (i) a composite material;
  (ii) a cylindrical section having planar sides; and
  (iii) a second hole through the center of said at least one puck and
(b) means for fastening said beams and said at least one shear puck together, said fastening means comprising:
  (i) a bolt positioned through said first hole and second holes; and
  (ii) a retaining nut.

7. The connection of claim 6 wherein said composite material is fiber-glass.

8. The connection of claim 7 wherein said fiber-glass comprises approximately 35-40% continuous strand glass mat and approximately 60-65% of isophalic polyester resin.

9. The connection of claim 8 wherein at least one shear puck is formed by a resin transfer molding process.

* * * * *